United States Patent
Avramidis et al.

(10) Patent No.: US 11,505,636 B2
(45) Date of Patent: Nov. 22, 2022

(54) BINDER COMPOSITIONS AND METHODS OF PREPARING AND USING THE SAME

(71) Applicant: BASF SE, Ludwigshafen (DE)

(72) Inventors: Kostas S. Avramidis, Charlotte, NC (US); Armin A. Burghart, Charlotte, NC (US); Don M. Cho, Wyandotte, MI (US); Luke S. Egan, Charlotte, NC (US); Vanessa Adams, Charlotte, NC (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/463,555

(22) PCT Filed: Nov. 21, 2017

(86) PCT No.: PCT/US2017/062724
§ 371 (c)(1),
(2) Date: May 23, 2019

(87) PCT Pub. No.: WO2018/098127
PCT Pub. Date: May 31, 2018

(65) Prior Publication Data
US 2019/0375865 A1    Dec. 12, 2019

Related U.S. Application Data

(60) Provisional application No. 62/425,782, filed on Nov. 23, 2016.

(51) Int. Cl.
| | | |
|---|---|---|
| C08F 220/18 | (2006.01) | |
| C08F 212/08 | (2006.01) | |
| C08F 220/06 | (2006.01) | |
| C08F 220/56 | (2006.01) | |
| C08F 283/06 | (2006.01) | |
| C08F 2/00 | (2006.01) | |
| C08F 2/20 | (2006.01) | |
| C08F 301/00 | (2006.01) | |
| C08G 75/24 | (2006.01) | |
| C08G 77/04 | (2006.01) | |
| C09D 151/08 | (2006.01) | |

(52) U.S. Cl.
CPC .......... *C08F 283/06* (2013.01); *C08F 2/001* (2013.01); *C08F 2/20* (2013.01); *C08F 212/08* (2013.01); *C08F 220/06* (2013.01); *C08F 220/56* (2013.01); *C08F 301/00* (2013.01); *C08G 75/24* (2013.01); *C08G 77/04* (2013.01); *C09D 151/08* (2013.01); *C08F 220/1804* (2020.02); *C08F 220/1806* (2020.02); *C08G 2150/00* (2013.01)

(58) Field of Classification Search
CPC .......... C08F 220/1804; C08F 220/1806; C08F 220/06; C08F 220/18; C08F 220/20; C08F 220/44; C08F 220/56; C08F 212/08
See application file for complete search history.

(56) References Cited

U.S. PATENT DOCUMENTS

| | | | |
|---|---|---|---|
| 6,841,655 B1 | 1/2005 | Gota et al. | |
| 8,906,997 B2 | 12/2014 | Burghart | |
| 9,353,195 B2* | 5/2016 | Ogasawara | ........... C08F 220/14 |
| 2006/0160923 A1* | 7/2006 | Koganehira | ........... C09D 11/30 |
| | | | 523/160 |
| 2008/0097058 A1* | 4/2008 | Ishizuki | ................. C09D 11/18 |
| | | | 526/209 |
| 2009/0163619 A1 | 6/2009 | Hsu et al. | |
| 2010/0062264 A1 | 3/2010 | Hayes et al. | |
| 2011/0054113 A1 | 3/2011 | Kania et al. | |
| 2012/0107619 A1* | 5/2012 | Kitagawa | ............. C09D 175/04 |
| | | | 428/423.1 |

(Continued)

FOREIGN PATENT DOCUMENTS

| | | |
|---|---|---|
| CN | 1385447 A | 12/2002 |
| CN | 103906768 A | 7/2014 |

(Continued)

OTHER PUBLICATIONS

International Search Report and Written Opinion dated Jun. 29, 2018, from International Application No. PCT/US2017/062724, 20 pages.
Antonietti, M. et al. "90 Years of Polymer Latexes and Heterophase Polymerization: More vital than ever", Macromol. Chem. Phys. 2003, 204, 207-219.
Bassett, D. R. "Hydrophobic Coatings from Emulsion Polymers" Technical Articles, vol. 73, No. 912, Jan. 2001.
Sarac, A.S. "Redox polymerization", Prog. Polym. Sci. 24 (1999) 1149-1204.

(Continued)

*Primary Examiner* — Karuna P Reddy
(74) *Attorney, Agent, or Firm* — Faegre Drinker Biddle & Reath LLP

(57) ABSTRACT

The present disclosure relates to compositions comprising a copolymer derived from a vinyl aromatic monomer, a (meth)acrylate monomer, an acid monomer, and a copolymerizable surfactant and compositions comprising the same. The (meth)acrylate monomer can be selected from a monomer having a theoretical glass transition temperature (Tg) for its corresponding homopolymer of 0° C. or less or a hydrophobic (meth)acrylate monomer. In some embodiments, the copolymer is further derived from an organosilane. The copolymers can have a theoretical glass transition temperature (Tg) from −60° C. to 80° C. and a number average particle size of 250 nm or less. The compositions can be used to prepare compositions such as coatings that have improved water resistance, blush resistance, and/or resistance to hydrostatic pressures. Methods of making the copolymers are also provided.

14 Claims, No Drawings

(56) References Cited

U.S. PATENT DOCUMENTS

| | | | |
|---|---|---|---|
| 2012/0152459 A1* | 6/2012 | Avramidis | C08G 59/223 |
| | | | 156/334 |
| 2014/0249272 A1* | 9/2014 | Ogasawara | C08K 3/20 |
| | | | 524/819 |
| 2015/0038654 A1* | 2/2015 | Ogasawara | C08F 290/142 |
| | | | 525/534 |
| 2015/0259559 A1 | 9/2015 | Petrie et al. | |
| 2021/0163645 A1 | 6/2021 | Avramidis et al. | |

FOREIGN PATENT DOCUMENTS

| | | | | |
|---|---|---|---|---|
| EP | 1095953 | | 5/2001 | |
| EP | 2341111 | | 7/2011 | |
| JP | 04050204 A | * | 2/1992 | B01F 17/0021 |
| JP | 2003-147255 A | * | 5/2003 | |
| WO | 2012/109130 | | 8/2012 | |
| WO | 2016/101105 | | 6/2016 | |

OTHER PUBLICATIONS

Sperling, L.H. "Glass-Rubber Transition Behavior", Physical Polymer Science, Fourth Edition, 2006.

Fox, T.G. Bull. Am. Phys. Soc, 1, 123 (1956).

International Preliminary Report on Patentability received for PCT Patent Application No. PCT/US2017/062724, dated Jun. 6, 2019, 12 pages.

International Search Report and Written Opinion received for PCT Patent Application No. PCT/US2017/062724, dated Jun. 29, 2018, 17 pages.

\* cited by examiner

BINDER COMPOSITIONS AND METHODS OF PREPARING AND USING THE SAME

FIELD OF THE DISCLOSURE

The present disclosure relates to compositions containing a copolymer derived from a hydrophobic monomer for use in a variety of applications.

BACKGROUND

A requirement of many building articles is that they be water resistant. This is because a high amount of water absorption can weaken these articles and lead to cracking. Waterborne coatings are commonly applied to a wide variety of substrates, such as wood, metal, masonry, plaster, stucco, and plastic. In many of these applications, the coating, which is based, upon an emulsion polymer, is exposed to wet environments caused by rain, dew, snow, and other sources of water. Waterborne coatings, especially clear aqueous coatings tend to blush or whiten when exposed to water. In particular, as a latex film forms, the particles initially coalesce at the air interface. Hydrophilic material is trapped in the interstices between particles. If the film composition is semipermeable, when it is exposed to water, the hydrophilic pockets will swell. The swollen pockets usually have a refractive index different from the polymer. As the pockets swell above a certain size, they scatter light, and the film becomes turbid. Various measures have been used to address this issue including crosslinking the polymer compositions.

There is a need for coatings and in particular, waterborne coatings having good water resistance, water blushing resistance as well as hydrostatic pressure resistance. Such coatings would be of particular value for use on structures such as concrete, tile, or brick surfaces. The compositions and methods described herein address these and other needs.

SUMMARY OF THE DISCLOSURE

Provided herein are copolymers derived from monomers comprising a vinyl aromatic monomer, a (meth)acrylate monomer, an acid monomer, and a copolymerizable surfactant. Compositions comprising the copolymers are also provided. The copolymer compositions can be used to prepare coatings that exhibit improved blush resistance and/or resistance to hydrostatic pressures. The copolymers can have a theoretical glass transition temperature ($T_g$) from −60° C. to 80° C. and a number average particle size of 250 nm or less such as 200 nm or less or 150 nm or less.

As described herein, the copolymer is derived from a (meth)acrylate monomer. In some aspects, the (meth)acrylate monomer includes a monomer having a theoretical glass transition temperature ($T_g$) for its corresponding homopolymer of 0° C. or less. For example, the (meth)acrylate monomer can have a $T_g$ for its corresponding homopolymer of −25° C. or less. In some aspects, the (meth)acrylate monomer includes a hydrophobic (meth)acrylate monomer. Suitable (meth)acrylate monomers for use in the copolymers include $C_4$-$C_{10}$-alkyl (meth)acrylate monomers. For example, the (meth)acrylate monomers can be selected from 2-ethylhexyl acrylate, butyl acrylate, isobutyl acrylate, heptyl acrylate, octyl acrylate, isooctyl acrylate, isodecyl acrylate, lauryl (meth)acrylate, cyclohexyl (meth)acrylate, heptadecyl (meth)acrylate, 2-propylheptyl acrylate, n-hexyl acrylate, or a combination thereof. In some embodiments, the (meth)acrylate monomer includes 2-ethylhexyl acrylate. In some embodiments, the (meth)acrylate monomer includes lauryl (meth)acrylate.

The copolymer can be derived from 5% or greater by weight vinyl aromatic monomer. For example, the copolymer can be derived from 20%-80% by weight vinyl aromatic monomer. Suitable vinyl aromatic monomers for use in the copolymers include styrene. In certain embodiments, the copolymer can be derived from a vinyl aromatic monomer and a hydrophobic (meth)acrylate monomer having a theoretical glass transition temperature ($T_g$) for its corresponding homopolymer of greater than 0° C.

The copolymer can be derived from 5% or less by weight of an acid monomer. For example, the copolymer can be derived from 0.1% to 5% by weight of the acid monomer. Suitable acid monomers for use in the copolymers include acrylic acid, methacrylic acid, itaconic acid, maleic acid, fumaric acid, crotonic acid, or a mixture thereof.

As disclosed herein, the copolymer is derived from a copolymerizable surfactant. The copolymerizable surfactant can have a Formula III, or a salt thereof as shown below:

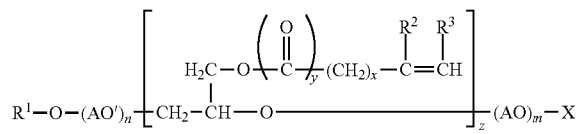

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, X represents a hydrogen atom or an ionic hydrophilic group, x is an integer from 0 to 12, y is 0 or 1, z is an integer from 1 to 10, m is an integer from 0 to 1,000, and n is an integer from 0 to 1,000. The copolymer can be derived from 5% by weight or less, such as from 0.5% to 2% by weight of the copolymerizable surfactant.

The copolymers can include one or more additional monomers. The one or more additional monomers can include an organosilane represented by the formula $(R^1)$—(Si)—$(OR^2)_3$, wherein $R^1$ is a $C_1$-$C_8$ substituted or unsubstituted alkyl or a $C_1$-$C_8$ substituted or unsubstituted alkene and $R^2$, which can be the same or different, each is a $C_1$-$C_8$ substituted or unsubstituted alkyl group. Suitable organosilanes for use in the copolymers include vinyltrimethoxysilane, vinyltriethoxysilane, vinyl tris(2-methoxyethoxysilane), vinyl triisopropoxysilane, (meth)acryloyloxypropyltrimethoxysilane, γ-(meth)acryloxypropyltrimethoxysilane, γ-(meth)acryloxypropyltriethoxysilane, or a mixture thereof. The copolymer can include 1% by weight or less organosilane.

In some embodiments, the one or more additional monomers can include a multivinyl siloxane oligomer having a Si—O—Si backbone and at least one alkoxy group, methyl acrylate, methyl methacrylate, (meth)acrylonitrile, (meth)acrylamide, a hydroxyl (meth)acrylate, an acetoacetoxy monomer, a crosslinking monomer, or a mixture thereof. In some embodiments, the copolymer is not derived from a crosslinkable monomer. In some embodiments, the copolymer is not crosslinked.

In some embodiments, the copolymer can include 40% to 65% by weight styrene; 30% to 55% by weight of a (meth)acrylate monomer selected from butyl acrylate, ethyl hexyl acrylate, or a mixture thereof; 1% to 4% by weight of an acid monomer selected from itaconic acid, acrylic acid, or a mixture thereof; 0% to 4% by weight of an additional monomer selected from methyl methacrylate, (meth)acrylonitrile, (meth)acrylamide, an acetoacetoxy monomer, a hydroxyl (meth)acrylate, an organosilane, or a mixture thereof; and 0.5% to 2% by weight of the copolymerizable surfactant.

In some embodiments, the copolymer can include 50% to 60% by weight styrene; 35% to 45% by weight of a (meth)acrylate monomer selected from butyl acrylate, ethyl hexyl acrylate, or a mixture thereof; 1% to 3% by weight of an acid monomer selected from itaconic acid, acrylic acid, or a mixture thereof; 0% to 2% by weight of an additional monomer selected from methyl methacrylate, (meth)acrylonitrile, (meth)acrylamide, an acetoacetoxy monomer, a hydroxyl (meth)acrylate, an organosilane, or a mixture thereof; and from 0.5% to 2% by weight of the copolymerizable surfactant.

The copolymers can have a number average particle size of 100 nm or less, such as from 10 nm to less than 100 nm. The particles can be single phase particle produced by a single polymerization stage. In some cases, the particles can be multiple phases (two or more phases) produced by multiple polymerization stages. The copolymers can have a theoretical glass transition temperature of from −60° C. to 80° C. such as from −40° C. to 80° C., from −10° C. to 50° C., from 0° C. to 80° C., or from 0° C. to 50° C. In some embodiments, the weight average molecular weight of the copolymer can be 100,000 Daltons or greater. In some embodiments, the weight average molecular weight of the copolymer can be 1,000,000 Daltons or greater. The copolymers can have a gel content of from 0-95%.

Compositions comprising the copolymers are also provided. In addition to the copolymers, the compositions can further comprise one or more additional surfactants and/or a polyamine. The one or more additional surfactants can be selected from an alkyl sulfate surfactant, an alkyl aryl disulfonate surfactant, or a combination thereof. The polyamine can include a derivatized polyamine such as an alkoxylated polyalkyleneimine, an alkylated polyalkyleneimine, or a combination thereof.

The compositions can be used in coatings such as a paint, a membrane, or an adhesive. In some instances, the coatings can consist essentially of a copolymer as described herein and one or more coalescing aids. In some embodiments, the coating is resistant to hydrostatic pressure of at least 4 psi, such as from 4 psi to 20 psi, in accordance with ASTM D7088-08. In some embodiments, the coating can have a blush resistance of at least 16 hours when exposed to water. In some embodiments, the compositions can include one or more coalescing aids and/or one or more plasticizers. The coalescing aid and/or the plasticizer can be present in an effective amount to produce a composition having a Tg less than ambient temperature (e.g., 20° C.). In some embodiments, the compositions do not include a coalescing aid. In some embodiments, the compositions do not include a plasticizer.

Methods of making the copolymers are also provided. The method can include polymerizing the vinyl aromatic monomer, the (meth)acrylate monomer, the acid monomer, the optional organosilane monomer, and the copolymerizable surfactant to produce a copolymer having a theoretical glass transition temperature ($T_g$) from −60° C. to 80° C. Polymerization can be carried out in the presence or absence of a molecular weight regulator.

The details of one or more embodiments are set forth in the description below. Other features, objects, and advantages will be apparent from the description and from the claims.

DETAILED DESCRIPTION

Provided herein are compositions that can exhibit improved blush resistance and/or are resistant to hydrostatic pressures of at least 4 psi. The compositions can comprise a copolymer derived from monomers comprising a vinyl aromatic monomer, a (meth)acrylate monomer, an acid monomer, optionally an organosilane monomer, and a copolymerizable surfactant. In some aspects, the (meth)acrylate monomer includes a monomer having a theoretical glass transition temperature ($T_g$) for its corresponding homopolymer of 0° C. or less. In some aspects, the (meth)acrylate monomer is a hydrophobic (meth)acrylate monomer.

As used herein, "(meth)acryl . . . " includes acryl . . . , methacryl . . . , diacryl . . . , and dimethacryl . . . . For example, the term "(meth)acrylate monomer" includes acrylate, methacrylate, diacrylate, and dimethacrylate monomers.

As used herein, a "hydrophobic monomer" refers to a monomer having a water solubility of less than 1 g/100 g water at 20° C. For example, the solubility of the hydrophobic monomers in water, measured at 20° C., can be 0.8 g/100 g water or less, 0.6 g/100 g water or less, 0.2 g/100 g water or less, 0.1 g/100 g water or less, 0.05 g/100 g water or less, 0.03 g/100 g water or less, or 0.01 g/100 g water or less. Suitable hydrophobic monomers include as noted herein butyl acrylate (0.16 g/100 g water) and 2-ethylhexyl acrylate (0.01 g/100 g water). Solubilities can be provided, e.g., from D. R. Bassett, "Hydrophobic Coatings for Emulsion Polymers," Journal of Coatings Technology, January 2001, or High Polymers Vol. IX: Emulsion Polymerization, F. A. Bovey, I. M. Kolthoff, A. I. Medalia and E. J. Meehan, p. 156, 1954. The hydrophobic monomers as polymerized units can provide compositions with improved resistance to moisture.

In some embodiments, at least 50% by weight of the monomers in the copolymers can be hydrophobic monomers, that is, having a water solubility of less than 1 g/100 g water at 20° C. For example, at least 55% by weight (e.g., at least 60%, at least 65%, at least 70%, at least 75%, at least 80%, at least 85%, at 90%, at least 95%, from 50% to 99%, from 55% to 99%, from 60% to 98%, from 70% to 98%, from 80% to 98%, from 80% to 95%, or from 85% to 95%) of the monomers in the copolymers can have a water solubility of less than 1 g/100 g water at 20° C. (e.g., 0.8 g/100 g water or less, 0.6 g/100 g water or less, 0.2 g/100 g water or less, 0.1 g/100 g water or less, 0.05 g/100 g water or less, 0.03 g/100 g water or less, or 0.01 g/100 g water or less). In some embodiments, the copolymers have a weighted average water solubility for the monomers (based on the weight percent of the monomers in the copolymers) that is less than 1 g/100 g water at 20° C. (e.g., 0.8 g/100 g water or less, 0.6 g/100 g water or less, 0.2 g/100 g water or less, 0.1 g/100 g water or less, 0.05 g/100 g water or less, 0.03 g/100 g water or less, or 0.01 g/100 g water or less). For example, a copolymer derived from 60% butyl acrylate (0.16 g/100 g water) and 40% 2-ethylhexyl acrylate (0.01 g/100 g water) would have a weighted average water solubility of 0.6 (0.16)+0.4 (0.01) or 0.1 g/100 g water.

In some embodiments, the hydrophobic (meth)acrylate monomer includes an alkyl (meth)acrylate monomer having at least 4 carbon atoms in the alkyl group. For example, the hydrophobic (meth)acrylate monomer can comprise a $C_4$-$C_{20}$-alkyl (meth)acrylate, such as a $C_4$-$C_{10}$-alkyl (meth)acrylate.

The hydrophobicity of the hydrophobic (meth)acrylate monomers can be defined by the log of their octanol/water partition coefficient (log P). The higher the numerical value, the more hydrophobic is the monomer. The log P of a compound can be calculated using MedChem, version 3.54, a software package available from the Medicinal Chemistry Project, Pomona College, Claremont, Calif. The log P of the following monomers have been calculated: acrylic acid as 0.16; methyl acrylate as 0.75; methyl methacrylate as 1.06; ethyl acrylate as 1.28; ethyl methacrylate as 1.59; butyl acrylate as 2.33; butyl methacrylate as 2.64; styrene as 2.89; 2-ethylhexyl acrylate as 4.32; 2-ethylhexyl methacrylate as 4.62; and t-butylstyrene as 4.70. In some embodiments, the hydrophobic (meth)acrylate monomers can have a calculated log P of 2 or greater (e.g. 2.2 or greater).

In some embodiments, at least 50% by weight of the monomers in the copolymers can have a log P of 1.6 or greater. For example, at least 50% by weight (e.g., at least 60%, at least 65%, at least 70%, at least 75%, at least 80%, at least 85%, at 90%, at least 95%, from 50% to 99%, from 55% to 99%, from 60% to 98%, from 70% to 98%, from 80% to 98%, from 80% to 95%, or from 85% to 95%) of the monomers in the copolymers can have a log P of 1.6 or greater (e.g., 1.8 or greater, 2 or greater, 2.2 or greater, 2.3 or greater, 2.5 or greater, 2.6 or greater, from 1.6 to 5, from 1.8 to 5, from 2 to 5, from 2.2 to 5, or from 2.3 to 4.5). In some embodiments, the copolymers have a weighted average log P of the monomers (based on the weight percent of the monomers in the copolymers) that is 1.6 or greater, 1.8 or greater, 2 or greater, 2.2 or greater, 2.3 or greater, 2.5 or greater, 2.6 or greater, from 1.6 to 5, from 1.8 to 5, from 2 to 5, from 2.2 to 5, or from 2.3 to 4.5).

The (meth)acrylate monomer can include esters of α,β-monoethylenically unsaturated monocarboxylic and dicarboxylic acids having 3 to 6 carbon atoms with alkanols having 1 to 20 carbon atoms (e.g., esters of acrylic acid, methacrylic acid, maleic acid, fumaric acid, or itaconic acid, with $C_1$-$C_{20}$, $C_4$-$C_{20}$, $C_1$-$C_{16}$, or $C_4$-$C_{16}$ alkanols).

In some embodiments, the copolymer includes a (meth)acrylate monomer having a theoretical glass transition temperature ($T_g$) for its corresponding homopolymer of 0° C. or less. The (meth)acrylate monomer having a theoretical glass transition temperature ($T_g$) for its corresponding homopolymer of 0° C. or less can also be a hydrophobic (meth)acrylate monomer as discussed herein.

In some embodiments, the (meth)acrylate monomer used in the copolymer can have a theoretical glass-transition temperature (Tg) for its corresponding homopolymer of 0° C. or less (e.g., −5° C. or less, −10° C. or less, −15° C. or less, −20° C. or less, −25° C. or less, −30° C. or less, −35° C. or less, −40° C. or less, −45° C. or less, or −50° C. or less). The (meth)acrylate monomer can have a theoretical Tg for its corresponding homopolymer of −80° C. or greater (e.g., −75° C. or greater, −70° C. or greater, −65° C. or greater, −60° C. or greater, −55° C. or greater, −50° C. or greater, −45° C. or greater, −40° C. or greater, −35° C. or greater, −30° C. or greater, −25° C. or greater, −20° C. or greater, or −15° C. or greater). The (meth)acrylate monomer can have a theoretical Tg for its corresponding homopolymer ranging from any of the minimum values described above to any of the maximum values described above. For example, the (meth)acrylate monomer can have a theoretical Tg for its corresponding homopolymer of from −80° C. to 0° C. (e.g., from −70° C. to 0° C., from −60° C. to 0° C., from −50° C. to 0° C., or from −60° C. to −10° C.).

Exemplary (meth)acrylate monomers that can be used in the copolymers include ethyl (meth)acrylate, n-butyl (meth)acrylate, iso-butyl (meth)acrylate, tert-butyl (meth)acrylate, isobutyl (meth)acrylate, n-hexyl (meth)acrylate, 2-ethylhexyl (meth)acrylate, n-heptyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, heptadecyl (meth)acrylate, lauryl (meth)acrylate, tridecyl (meth)acrylate, stearyl (meth)acrylate, glycidyl (meth)acrylate, allyl (meth)acrylate, tetrahydrofurfuryl (meth)acrylate, cyclohexyl (meth)acrylate, 2-propylheptyl (meth)acrylate, behenyl (meth)acrylate, or combinations thereof.

The copolymers can be derived from two or more, three or more, or four or more (meth)acrylate monomers. In some embodiments, the copolymer can be derived from at least two (meth)acrylate monomers. In some examples, the copolymer can be derived from one or more (meth)acrylate monomers selected from butyl acrylate, 2-ethylhexyl acrylate, isobutyl acrylate, heptyl acrylate, octyl acrylate, isooctyl acrylate, isodecyl acrylate, lauryl (meth)acrylate, cyclohexyl (meth)acrylate, heptadecyl (meth)acrylate, 2-propylheptyl acrylate, n-hexyl acrylate, or combinations thereof.

The copolymers can be derived from greater than 5% by weight of one or more of the (meth)acrylate monomers. For example, the copolymers can be derived from 10% by weight or greater, 15% by weight or greater, 20% by weight or greater, 25% by weight or greater, 30% by weight or greater, 35% by weight or greater, 40% by weight or greater, 45% by weight or greater, 50% by weight or greater, 55% by weight or greater, 60% by weight or greater, 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer, based on the total weight of monomers from which the copolymer is derived. In some embodiments, the copolymer can be derived from 95% by weight or less of one or more (meth)acrylate monomers (e.g., 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, or 25% by weight or less of the (meth)acrylate monomer) based on the total weight of monomers from which the copolymer is derived.

The copolymers can be derived from any of the minimum values to any of the maximum values by weight described above of one or more (meth)acrylate monomers. For example, the copolymers can be derived from 5% to 95% by weight (e.g., from 10% to 80%, 20% to 80%, from 25% to 70%, from 20% to 60%, from 25% to 60%, or from 35% to 45%) of one or more (meth)acrylate monomers, based on the total weight of monomers from which the copolymer is derived. In some embodiments, the copolymers can be derived from 5% to 95% by weight (e.g., from 10% to 80%, 20% to 80%, from 25% to 70%, from 20% to 60%, from 25% to 60%, or from 35% to 45%) of one or more hydrophobic (meth)acrylate monomers, based on the total weight of monomers from which the copolymer is derived. In some embodiments, the copolymer can be derived from 5% to 95% by weight (e.g., from 10% to 80%, 20% to 80%, from 25% to 70%, from 20% to 60%, from 25% to 60%, or from 35% to 45%) of one or more (meth)acrylate monomer having a theoretical glass transition temperature ($T_g$) for its corresponding homopolymer of 0° C. or less, based on the total weight of monomers from which the copolymer is derived.

In some embodiments, the copolymer can be derived from a hydrophobic (meth)acrylate monomer having a theoretical glass transition temperature ($T_g$) of greater than 0° C. for its corresponding homopolymer. Examples of such hydrophobic (meth)acrylate monomers include cyclohexyl methacrylate, t-butyl acrylate, t-butyl methacrylate, stearyl methacrylate, behenyl methacrylate, and allyl methacrylate. When the copolymer is derived from a hydrophobic (meth)acrylate monomer having a theoretical glass transition temperature ($T_g$) of greater than 0° C. for its corresponding homopolymer, the amount of vinyl aromatic monomer incorporated in the copolymer can be reduced, compared to a copolymer that does not include the hydrophobic monomer. Particularly, the hydrophobic (meth)acrylate monomer having a theoretical glass transition temperature ($T_g$) for its corresponding homopolymer of greater than 0° C. can replace a portion or all of the vinyl aromatic monomer that would have been included in the copolymer. In these embodiments, the copolymer can be derived from 1% to 80% by weight (e.g., from 20% to 80%, from 20% to 60% or from 30% to 60% by weight of the hydrophobic (meth)acrylate monomer), based on the total weight of monomers from which the copolymer is derived.

As described herein, the copolymers can be further derived from a vinyl aromatic monomer. Suitable vinyl aromatic monomers include styrene, or an alkyl styrene such as α- and p-methylstyrene, α-butylstyrene, p-n-butylstyrene, p-n-decylstyrene, vinyltoluene, and combinations thereof. The vinyl aromatic monomer can be present in an amount of 1% by weight or greater (e.g., 5% by weight or greater, 10% by weight or greater, 15% by weight or greater, 20% by weight or greater, 25% by weight or greater, 30% by weight or greater, 35% by weight or greater, 40% by weight or greater, 45% by weight or greater, 50% by weight or greater, 55% by weight or greater, 60% by weight or greater, 65% by weight or greater, 75% by weight or greater, or 80% by weight or greater), based on the total weight of monomers from which the copolymer is derived. In some embodiments, vinyl aromatic monomer can be present in the copolymer in an amount of 80% by weight or less (e.g., 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) based on the total weight of monomers from which the copolymer is derived. The copolymer can be derived from any of the minimum values to any of the maximum values by weight described above of the vinyl aromatic monomer. For example, the copolymer can be derived from 1% to 80% by weight (e.g., from 20% to 80%, from 20% to 60% or from 30% to 60% by weight of vinyl aromatic monomer), based on the total weight of monomers from which the copolymer is derived. In some embodiments, the copolymer can include as low as 1% by weight or less (such as 0% by weight) vinyl aromatic monomer, for example, when the copolymer is derived from a hydrophobic (meth)acrylate monomer having a theoretical glass transition temperature ($T_g$) of greater than 0° C. for its corresponding homopolymer.

The copolymers disclosed herein can be further derived from an acid monomer. The acid monomer can include a carboxylic acid-containing monomer. Examples of carboxylic acid-containing monomers include α,β-monoethylenically unsaturated mono- and dicarboxylic acids (e.g., acrylic acid, methacrylic acid, itaconic acid, maleic acid, fumaric acid, crotonic acid, dimethacrylic acid, ethylacrylic acid, allylacetic acid, vinylacetic acid, mesaconic acid, methylenemalonic acid, styrene carboxylic acid, or citraconic acid). In some embodiments, the one or more carboxylic acid-containing monomers can be selected from the group consisting of acrylic acid, methacrylic acid, itaconic acid, maleic acid, fumaric acid, crotonic acid, and combinations thereof.

The copolymer can be derived from greater than 0% by weight to 5% by weight (such as from 0.1% to 5% by weight) of one or more carboxylic acid-containing monomers, based on the total weight of monomers from which the copolymer is derived. In certain embodiments, the copolymer can be derived from greater than 0% by weight to 3% by weight or greater than 0% by weight to 2.5% by weight of one or more carboxylic acid-containing monomers, based on the total weight of monomers from which the copolymer is derived. In some embodiments, the copolymer is derived from 5% or less, 4% or less, 3.5% or less, 3% or less, 2.5% or less, 2% or less, 1.5% or less, or 1% or less by weight of carboxylic acid-containing monomers, based on the total weight of monomers from which the copolymer is derived. In some embodiments, the copolymer is derived from 0.1% or greater, 0.3% or greater, 0.5% or greater, or 1% or greater by weight of carboxylic acid-containing monomers, based on the total weight of monomers from which the copolymer is derived.

In addition to being derived from a (methacrylate) monomer, a vinyl aromatic monomer, and an acid monomer, the copolymers disclosed herein are further derived from a copolymerizable surfactant. In other words, the copolymerizable surfactant reacts during the polymerization and becomes part of the copolymer. It is believed that lowering the average particle size of the copolymers described herein can create a stability problem in the compositions. As such, a greater amount of surfactant would be required to stabilize such compositions. However, increasing the amount of surfactant may cause an increase in the level of hydrophilic material, which may lead to lower resistance to blushing. Using a copolymerizable surfactant can improve the stability of the copolymer particles and reduce the amount of free hydrophilic material available.

In some embodiments, the copolymer is derived from 5% by weight or less of the copolymerizable surfactant (e.g., 4% by weight or less, 3% by weight or less, 2% by weight or less, 1.5% by weight or less, 1% by weight or less, or 0.5% by weight or less), based on the total weight of monomers from which the copolymer is derived. In some embodiments, the copolymer is derived from greater than 0% by weight of the copolymerizable surfactant (e.g., 0.1% or greater, 0.3% or greater, 0.5% or greater, 0.75% or greater, or 1% or greater by weight). In some embodiments, the copolymer is derived from 0.1% to 5% by weight or less of the copolymerizable surfactant (e.g., from 0.1% to 4% by weight, from 0.1% to 2.5% by weight, from 0.5% to 5% by weight, or from 1% to 4% by weight), based on the total weight of monomers from which the copolymer is derived.

The copolymerizable surfactants included in the copolymers can comprise an olefinically unsaturated group that can participate in a free radical polymerization can be used. Suitable polymerizable surfactants include hemi-esters of maleic anhydride of the formula M⁺-OOC—CH=CHCOOR wherein R is $C_{6-22}$ alkyl and M⁺ is Na⁺, K⁺, Li⁺, $NH_4^+$, or a protonated or quaternary amine.

In some embodiments, copolymerizable surfactants suitable for use in the copolymer can have the formula I:

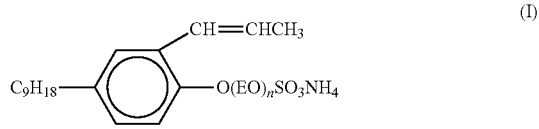

(I)

wherein n stands for a number of from 0 to 1,000. Exemplary copolymerizable surfactants can include the HITENOL® BC series (Dai-Ichi Kogyo Seiyaku Co., Ltd.), such as DC-10, BC-1025, BC-20, BD-2020, and BC-30.

In some embodiments, copolymerizable surfactants suitable for use in the copolymer can have the formula II:

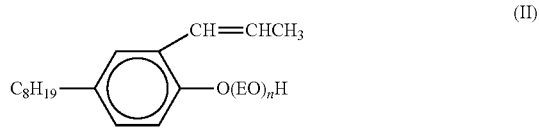

(II)

wherein n stands for a number of from 0 to 1,000. Exemplary copolymerizable surfactants can include the NOIGEN® RN series (Dai-Ichi Kogyo Seiyaku Co., Ltd.), such as RN-10, RN-20, RN-30, RN-40, and RN-5065.

In some embodiments, copolymerizable surfactants suitable for use in the copolymer can have the formula III:

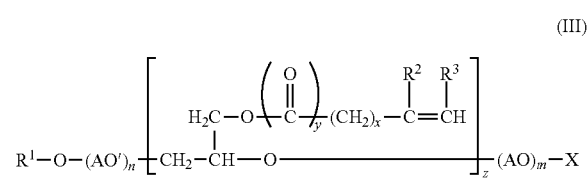

(III)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000. Suitable copolymerizable surfactants are described in U.S. Pat. No. 6,841,655, which is hereby incorporated by reference in its entirety.

In some embodiments, the copolymerizable surfactants can be provided according to Formula IIIa:

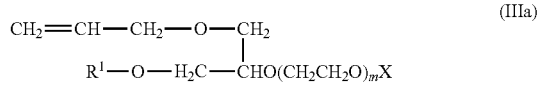

(IIIa)

wherein $R^1$ is $C_9$-$C_{15}$ alkyl or $C_7$-$C_{11}$ alkyl-phenyl, X is H, $SO_3NH_4$ and/or $SO_3Na$, and m is 3 to 50. In some embodiments, $R^1$ is $C_{10}$-$C_{14}$ alkyl, X is H and/or $SO_3NH_4$, and m is 5 to 40. In some embodiments, m is 5 to 25, 5 to 20, or 5 to 15 (e.g., m=10). Exemplary copolymerizable surfactants wherein $R^1$ is $C_{10}$-$C_{14}$ alkyl can include ADEKA REASOAP series ER and SR surfactants (Asahi Denka Co., Ltd.), such as ER-10, ER-20, ER-30, ER-40, SR-10, SR-20, and SR-1025. For example, ADEKA REASOAP SR-10, which includes ammonium salts of poly(oxy-1,2-ethanediyl), alpha-sulfo-omega-[1-(hydroxymethyl)-2-(2-propenyloxy)ethoxy]-, C11-rich, C10-14-branched alkyl ethers, can be used. Exemplary copolymerizable surfactants in which $R^1$ is $C_7$-$C_{11}$ alkyl-phenyl can include ADEKA REASOAP series NE and SE surfactants, such as NE-10, NE-20, NE-30, NE-40, NE-50, SE-10N, SE-20N, and SE-1025N.

Other representative copolymerizable surfactants can include MAXEMUL™ 6112, MAXEMUL™ 5011, MAXEMUL™ 5010 (all available from Croda Industrial Specialties) and allylsulfosuccinate derivatives (such as TREM LT-40™ (available from Henkel)).

The copolymers disclosed herein can be derived from one or more additional monomers. For example, the copolymer can further be derived from a silane-containing monomer, a (meth)acrylonitrile, a vinyl halide, a vinyl ether of an alcohol comprising 1 to 10 carbon atoms, an aliphatic hydrocarbon having 2 to 8 carbon atoms and one or two double bonds, a (meth)acrylamide, a (meth)acrylamide derivative, a phosphorus-containing monomer, an acetoacetoxy monomer, a sulfur-based monomer, a hydroxyl (meth)acrylate monomer, or a combination of these monomers.

In some embodiments, the copolymer includes a silane-containing monomer. The silane-containing monomer can include an organosilane defined by the general Formula IV below:

(IV)

wherein $R^1$ is a $C_1$-$C_8$ substituted or unsubstituted alkyl or a $C_1$-$C_8$ substituted or unsubstituted alkene and each of $R^2$ is independently a $C_1$-$C_8$ substituted or unsubstituted alkyl group. Suitable silane containing monomers can include, for example, vinyl silanes such as vinyltrimethoxysilane, vinyltriethoxysilane (VTEO), vinyl tris(2-methoxyethoxysilane), and vinyl triisopropoxysilane, and (meth)acrylatoalkoxysilanes, such as (meth)acryloyloxypropyltrimethoxysilane, γ-(meth)acryloxypropyltrimethoxysilane, γ-(meth)acryloxypropyltriethoxysilane, or a combination thereof. The organosilane monomers can act as crosslinkers in compositions comprising the copolymers. In some embodiments, the silane-containing monomer can be present in compositions comprising the copolymers disclosed herein. For example, the silane-containing monomer can be present in a composition comprising the copolymer rather than copolymerized with other monomers in the copolymer. In some examples, the silane-containing monomer can be copolymerized in the copolymer as well as present in a composition comprising the copolymer. In some embodiments, the copolymer is not derived from a crosslinkable monomer. In some embodiments, the copolymer is not crosslinked.

When present, the copolymer can include from greater than 0% by weight to 5% by weight of the silane-containing monomer, based on the total weight of monomers from which the copolymer is derived. In certain embodiments, the copolymer can be derived from greater than 0% to 2.5% by weight, from 0.1% to 2.5%, from 0.1% to 2% by weight, or from 0.5% to 1.5% by weight, of the silane-containing monomer, based on the total weight of monomers from which the copolymer is derived. In some embodiments, the copolymer is derived from 5% or less, 4% or less, 3.5% or less, 3% or less, 2.5% or less, 2% or less, or 1% or less by weight of the silane-containing monomer, based on the total weight of monomers from which the copolymer is derived. In some embodiments, the copolymer is derived from 0.1% or greater, 0.3% or greater, 0.5% or greater, 0.75% or greater, or 1% or greater by weight of the silane-containing monomer, based on the total weight of monomers from which the copolymer is derived.

In some embodiments, the copolymer includes a multivinyl siloxane oligomer. Multivinyl siloxane oligomers are described in U.S. Pat. No. 8,906,997, which is hereby incorporated by reference in its entirety. The multivinyl siloxane oligomer can include oligomers having a Si—O—Si backbone. For example, the multivinyl siloxane oligomer can have a structure represented by the Formula V below:

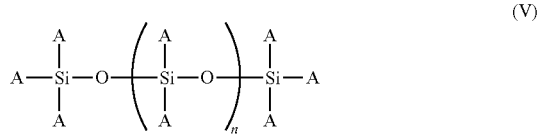

(V)

wherein each of the A groups are independently selected from hydrogen, hydroxy, alkoxy, substituted or unsubstituted $C_{1-4}$ alkyl, or substituted or unsubstituted $C_{2-4}$ alkenyl and n is an integer from 1 to 50 (e.g., 10). As used herein, the terms "alkyl" and "alkenyl" include straight- and branched-chain monovalent substituents. Examples include methyl, ethyl, propyl, butyl, isobutyl, vinyl, allyl, and the like. The term "alkoxy" includes alkyl groups attached to the molecule through an oxygen atom. Examples include methoxy, ethoxy, and isopropoxy.

In some embodiments, at least one of the A groups in the repeating portion of Formula V are vinyl groups. The presence of multiple vinyl groups in the multivinyl siloxane oligomers enables the oligomer molecules to act as cross-linkers in compositions comprising the copolymers. In some examples, the multivinyl siloxane oligomer can have the following structure represented by Formula Va below:

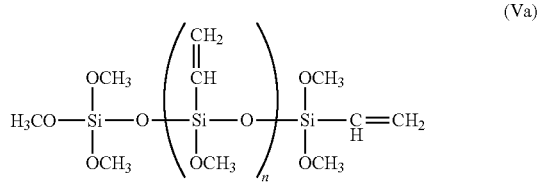

(Va)

In Formula Va, n is an integer from 1 to 50 (e.g., 10). Further examples of suitable multivinyl siloxane oligomers include DYNASYLAN 6490, a multivinyl siloxane oligomer derived from vinyltrimethoxysilane, and DYNASYLAN 6498, a multivinyl siloxane oligomer derived from vinyltriethoxysilane, both commercially available from Evonik Degussa GmbH (Essen, Germany). Other suitable multivinyl siloxane oligomers include VMM-010, a vinylmethoxysiloxane homopolymer, and VEE-005, a vinylethoxysiloxane homopolymer, both commercially available from Gelest, Inc. (Morrisville, Pa.).

In some embodiments, the copolymer includes a (meth)acrylamide or a derivative thereof. The (meth)acrylamide derivative include, for example, keto-containing amide functional monomers defined by the general Formula VI below $$CH_2=CR_1C(O)NR_2C(O)R_3 \quad (VI)$$

wherein $R_1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth) acrylamide derivative can be diacetone acrylamide (DAAM) or diacetone methacrylamide. Suitable acetoacetoxy monomers that can be included in the copolymer include acetoacetoxyalkyl (meth)acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; and combinations thereof. Sulfur-containing monomers that can be included in the copolymer include, for example, sulfonic acids and sulfonates, such as vinylsulfonic acid, 2-sulfoethyl methacrylate, sodium styrenesulfonate, 2-sulfoxyethyl methacrylate, vinyl butylsulfonate, sulfones such as vinylsulfone, sulfoxides such as vinylsulfoxide, and sulfides such as 1-(2-hydroxyethylthio) butadiene. Examples of suitable phosphorus-containing monomers that can be included in the copolymer include dihydrogen phosphate esters of alcohols in which the alcohol contains a polymerizable vinyl or olefenic group, allyl phosphate, phosphoalkyl(meth)acrylates such as 2-phosphoethyl(meth) acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl (meth)acrylate, 3-hydroxypropyl(meth)acrylate, ethylene oxide condensates of (meth)acrylates, $H_2C=C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof. Hydroxy (meth)acrylates that can be included in the copolymer include, for example, hydroxyl functional monomers defined by the general Formula VII below

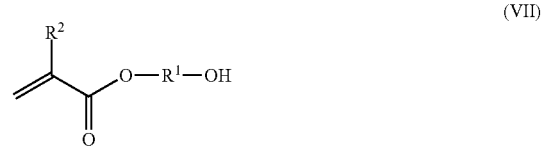

(VII)

wherein $R^1$ is hydrogen or methyl and $R_2$ is hydrogen, a $C_1$-$C_4$ alkyl group, or a phenyl group. For example, the hydroxyl (meth)acrylate can include hydroxypropyl (meth) acrylate, hydroxybutylacrylate, hydroxybutylmethacrylate, hydroxyethylacrylate (HEA) and hydroxyethylmethacrylate (HEMA).

Other suitable additional monomers that can be included in the copolymer include methyl (meth)acrylate, ethyl (meth)acrylate, alkyl crotonates, di-n-butyl maleate, di-octylmaleate, acetoacetoxyethyl (meth)acrylate, acetoacetoxypropyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2 ethoxyethoxy)ethyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate, or combinations thereof.

When present, the one or more additional monomers can be present in small amounts (e.g., 10% by weight or less, 7.5% by weight or less, 5% by weight or less, 4% by weight or less, 3% by weight or less, 2% by weight or less, 1.5% by weight or less, 1% by weight or less, or 0.5% by weight or less), based on the total weight of monomers from which the copolymer is derived. The one or more additional monomers when present can be present in an amount of greater than 0%, 0.1% by weight or greater, 0.3% or greater, 0.5% or greater, 0.75% or greater, or 1% or greater by weight, based on the total weight of monomers from which the copolymer is derived. The one or more additional monomers when present can be present in an amount of from 0% to 5% by weight, from 0.1% to 5% by weight, from 0.5% to 4% by weight, or from 0.1% to 3% by weight, based on the total weight of monomers from which the copolymer is derived.

The copolymers disclosed herein can include the following components (based on total weight of the copolymer): 1% to 80% by weight of one or more vinyl aromatic monomer; 20% to 95% by weight of one or more hydrophobic (meth)acrylate monomer; 0.5% to 5% by weight of an acid monomer; 0% to 5% by weight of one or more additional monomer; and 0.5% to 2% by weight of a copolymerizable surfactant. In certain embodiments, the copolymers can include the following components (based on total weight of the copolymer): 40% to 65% by weight of one or more vinyl aromatic monomer; 30% to 55% by weight of one or more (meth)acrylate monomer having a theoretical glass transition temperature ($T_g$) for its corresponding homopolymer of 0° C. or less; 1% to 4% by weight of an acid monomer; 0% to 4% by weight of one or more additional monomer; and 0.5% to 2% by weight of a copolymerizable surfactant.

In some examples, the copolymers can include the following components (based on total weight of the copolymer): 40% to 65% by weight styrene; 30% to 55% by weight of a (meth)acrylate monomer selected from butyl acrylate, ethyl hexyl acrylate, or a mixture thereof; 1% to 4% by weight of an acid monomer selected from itaconic acid, acrylic acid, or a mixture thereof; 0% to 4% by weight of an additional monomer selected from an organosilane, methyl methacrylate, (meth)acrylonitrile, (meth)acrylamide, an acetoacetoxy monomer, a hydroxyl (meth)acrylate, or a mixture thereof; and 0.5% to 2% by weight of the copolymerizable surfactant.

In some examples, the copolymers can include the following components (based on total weight of the copolymer): 50% to 60% by weight styrene; 35% to 45% by weight of a (meth)acrylate monomer selected from butyl acrylate, ethyl hexyl acrylate, or a mixture thereof; 1% to 3% by weight of an acid monomer selected from itaconic acid, acrylic acid, or a mixture thereof; 0% to 2% by weight of an additional monomer selected from an organosilane, methyl methacrylate, (meth)acrylonitrile, (meth)acrylamide, an acetoacetoxy monomer, a hydroxyl (meth)acrylate, or a mixture thereof; and 0.5% to 2% by weight of the copolymerizable surfactant, wherein the copolymer has a number average particle size of 120 nm or less.

The copolymers can have a theoretical glass-transition temperature (Tg) and/or a Tg as measured by differential scanning calorimetry (DSC) using the mid-point temperature using the method described, for example, in ASTM 3418/82, of 80° C. or less (e.g., 75° C. or less, 70° C. or less, 65° C. or less, 60° C. or less, 55° C. or less, 50° C. or less, 45° C. or less, 40° C. or less, 35° C. or less, 30° C. or less, 25° C. or less, or 20° C. or less). The copolymers can have a theoretical Tg and/or a Tg as measured by DSC using the mid-point temperature using the method described, for example, in ASTM 3418/82, of –40° C. or greater (e.g., –35° C. or greater, –30° C. or greater, –25° C. or greater, –20° C. or greater, –15° C. or greater, –10° C. or greater, –5° C. or greater, 0° C. or greater, 5° C. or greater, 10° C. or greater, or 15° C. or greater). The copolymers can have a theoretical Tg and/or a Tg as measured by DSC using the mid-point temperature using the method described, for example, in ASTM 3418/82, ranging from any of the minimum values described above to any of the maximum values described above. For example, the copolymers can have a theoretical glass-transition temperature (Tg) and/or a Tg as measured by differential scanning calorimetry (DSC) using the mid-point temperature using the method described, for example, in ASTM 3418/82, of from –60° C. to 80° C. (e.g., from –60° C. to 60° C., from –60° C. to 50° C., from –40° C. to 80° C., from –40° C. to 60° C., from –40° C. to 40° C., from –40° C. to 20° C., from –30° C. to 60° C., from –30° C. to 50° C., from –20° C. to 40° C., from –10° C. to 30° C., from –10° C. to 40° C., from –10° C. to 50° C., from 0° C. to 80° C., or from 0° C. to 50° C.).

The theoretical glass transition temperature or "theoretical $T_g$" of the copolymer refers to the estimated $T_g$ calculated using the Fox equation. The Fox equation can be used to estimate the glass transition temperature of a polymer or copolymer as described, for example, in L. H. Sperling, "Introduction to Physical Polymer Science", $2^{nd}$ Edition, John Wiley & Sons, New York, p. 357 (1992) and T. G. Fox, Bull. Am. Phys. Soc, 1, 123 (1956), both of which are incorporated herein by reference. For example, the theoretical glass transition temperature of a copolymer derived from monomers a, b, . . . , and i can be calculated according to the equation below $$\frac{1}{T_g} = \frac{w_a}{T_{ga}} + \frac{w_b}{T_{gb}} + \ldots + \frac{w_i}{T_{gi}}$$

where $w_a$ is the weight fraction of monomer a in the copolymer, $T_{ga}$ is the glass transition temperature of a homopolymer of monomer a, $w_b$ is the weight fraction of monomer b in the copolymer, To is the glass transition temperature of a homopolymer of monomer b, $w_i$ is the weight fraction of monomer i in the copolymer, $T_{gi}$ is the glass transition temperature of a homopolymer of monomer i, and $T_g$ is the theoretical glass transition temperature of the copolymer derived from monomers a, b, . . . , and i. The copolymers can comprise particles having a small particle size. In some embodiments, the copolymers can comprise particles having a number average particle size of 250 nm or less (e.g., 230 nm or less, 210 nm or less, 200 nm or less, 180 nm or less, 160 nm or less, 150 nm or less, 140 nm or less, 130 nm or less, 120 nm or less, 110 nm or less, 100 nm or less, 95 nm or less, 90 nm or less, or 85 nm or less). In some embodiments, the copolymers can have a number average particle size of 10 nm or greater, 20 nm or greater, 30 nm or greater, 35 nm or greater, 40 nm or greater, 45 nm or greater, 50 nm or greater, 55 nm or greater, 60 nm or greater, or 65 nm or greater. In some embodiments, the copolymers can have a number average particle size of from 10 nm to 250 nm, 10 nm to 220 nm, 10 nm to 200 nm, from 10 nm to 180 nm, from 10 nm to 150 nm, from 10 nm to 130 nm, from 10 nm 120 nm, 10 nm to 100 nm, or from 10 nm to less than 100 nm. In some embodiments, the copolymers can have a volume average particle size of from 10 nm to 250 nm, 10 nm to 220 nm, 10 nm to 200 nm, from 10 nm to 180 nm, from 10 nm to 150 nm, from 10 nm to 130 nm, from 10 nm 120 nm, 10 nm to 100 nm, or from 10 nm to less than 100 nm. The ratio between the volume average particle size (in nm) and the number average particle size (in nm) can be from 1.0 to 1.2 or from 1.0 to 1.1. The particle size can be determined using dynamic light scattering measurements using the Nanotrac Wave II Q available from Microtrac Inc., Montgomeryville, Pa.

It is believed that the small particle size of the copolymers can improve the blushing resistance of films formed from the copolymer. Without wishing to be bound by theory, the small particle size of the copolymers can reduce the size of the hydrophilic pockets formed during coalescence of the film. When the film is exposed to water, the hydrophilic pockets may swell. However, even when the pockets are fully swollen with water, they will stay small enough so as to not scatter light, and the film will remain clear. Notably, however, lowering the particle size of the copolymers creates a possible stability problem of the copolymer particles. A copolymerizable surfactant can be used to stabilize the copolymer particles.

In some embodiments, the weight average molecular weight of the copolymers can be 1,000,000 Da or greater. In some embodiments, the molecular weight of the copolymers can be adjusted by adding a molecular weight regulator during polymerization, for example, 0.01 to 4% by weight, based on the monomers being polymerized, such that the weight average molecular weight of the copolymers is less than 1,000,000 Da. Particular regulators which can be used include organic thio compounds (e.g., tert-dodecylmercaptan), allyl alcohols, and aldehydes. Such substances are preferably added to the polymerization zone in a mixture with the monomers to be polymerized and are considered part of the total amount of unsaturated monomers used in the polymers. In some embodiments, the weight average molecular weight of the copolymers can be 100,000 Da or greater (e.g., 200,000 Da or greater, 300,000 Da or greater, 400,000 Da or greater, 500,000 Da or greater, 600,000 Da or greater, 700,000 Da or greater, 800,000 Da or greater, 900,000 Da or greater, or 1,000,000 Da or greater). In some embodiments, the weight average molecular weight of the copolymers can be 1,000,000 Da or less (e.g., 900,000 Da or less, 800,000 Da or less, 700,000 Da or less, 600,000 Da or less, 500,000 Da or less, 400,000 Da or less, 300,000 Da or less, or 200,000 Da or less). In some embodiments, the weight average molecular weight of the copolymers can be from 100,000 Da to 1,000,000 Da. In some cases, the monomers in the copolymers are polymerized in the absence of a molecular weight regulator.

In some embodiments, the copolymer composition is a gel. In some embodiments, the copolymer composition has a gel content of from 0% to 95% (e.g., from 5% to 95% or from 10% to 95%). The gel content of the copolymer compositions can depend on the molecular weight of the copolymers in the composition. In certain embodiments, the copolymer composition has a gel content of 5% or greater, 10% or greater, 15% or greater, 20% or greater, 30% or greater, 40% or greater, 50% or greater, 60% or greater, 75% or greater, 80% or greater, 85% or greater, or 90% or greater. In certain embodiments, the copolymer composition has a gel content of 95% or less, 85% or less, 75% or less, 70% or less, 65% or less, 60% or less, 55% or less, or 50% or less.

The copolymers can be produced as a dispersion that includes, as a disperse phase, particles of the copolymers dispersed in water. The copolymers can be present in the dispersion in varying amounts so as to provide a resultant composition with the desired properties for a particular application. For example, the copolymer dispersion can be prepared with a total solids content of from 20% to 70% by weight (e.g., 25% to 65% by weight, 35% to 60% by weight, or 40% to 55% by weight). In some embodiments, the copolymer dispersion can have a total solids content of 40% or greater by weight. Despite the higher solids content of the aqueous dispersions, the aqueous dispersions disclosed herein can have a viscosity of 40 cP to 5,000 cP (e.g., from 100-4,000 cP, from 200-3,000 cP, from 300-2,000 cP, from 400-1,500 cP, or from 500-1,200 cP) at 20° C. The viscosity can be measured using a Brookfield type viscometer with a #2 spindle at 20 rpm at 20° C.

In addition to the copolymer, the dispersion can include an additional surfactant (emulsifier), i.e., a surfactant in addition to the polymerizable surfactant. The additional surfactant can include nonionic surfactants, anionic surfactants, cationic surfactants, amphoteric surfactants, or a mixture thereof. In some embodiments, the additional surfactant can include oleic acid surfactants, alkyl sulfate surfactants, alkyl aryl disulfonate surfactants, or alkylbenzene sulfonic acid or sulfonate surfactants. Exemplary additional surfactant can include ammonium lauryl sulfate, sodium laureth-1 sulfate, sodium laureth-2-sulfate, and the corresponding ammonium salts, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocyl sarcosine, ammonium cocoyl sulfate, ammonium lauroyl sulfate, sodium cocoyl sulfate, sodium lauroyl sulfate, potassium cocoyl sulfate, monoethanolamine cocoyl sulfate, monoethanolamine lauryl sulfate, sodium tridecyl benzene sulfonate, sodium dodecyl benzene sulfonate, C12 (branched) sodium diphenyl oxide disulfonate, or combinations thereof. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, Ohio), Disponil SDS, or combinations thereof. The amount of the additional surfactant employed can be from 0.01 to 5%, based on the total amount of the monomers to be polymerized. In some embodiments, the surfactant is provided in an amount less than 2% by weight. The additional surfactant can be included during polymerization of the copolymer. For example, the additional surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor. In some embodiments, the dispersion does not include an additional surfactant.

The copolymer dispersions can be used in coating formulations. The coating formulations can further include one or more additives such as one or more coalescing aids/agents (coalescents), plasticizers, defoamers, additional surfactants, pH modifying agents, fillers, pigments, dispersing agents, thickeners, biocides, crosslinking agents (e.g., quick-setting additives, for example, polyamines such as polyethyleneimine), flame retardants, stabilizers, corrosion inhibitors, flattening agents, optical brighteners and fluorescent additives, curing agents, flow agents, wetting or spreading agents, leveling agents, hardeners, or combinations thereof. In some embodiments, the additive can be added to impart certain properties to the coating such as smoothness, whiteness, increased density or weight, decreased porosity, increased opacity, flatness, glossiness, decreased blocking resistance, barrier properties, and the like.

Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, or combinations thereof. In some embodiments, the coating formulations can include one or more coalescing aids such as propylene glycol n-butyl ether and/or dipropylene glycol n-butyl ether. The coalescing aids, if present, can be present in an amount of from greater than 0% to 30%, based on the dry weight of the copolymer. For example, the coalescing aid can be present in an amount of from 10% to 30%, from 15% to 30% or from 15% to 25%, based on the dry weight of the copolymer. In some embodiments, the coalescing aid can be included in coating formulations comprising a high Tg copolymer (that is a copolymer having a Tg greater than ambient temperature (e.g., 20° C.)). In these embodiments, the coalescing aid can be present in an effective amount to provide coating formulations having a Tg less than ambient temperature (e.g., 20° C.). In some embodiments, the compositions do not include a coalescing aid.

Defoamers serve to minimize frothing during mixing and/or application of the coating component. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Plasticizers can be added to the compositions to reduce the glass transition temperature ($T_g$) of the compositions below that of the drying temperature to allow for good film formation. Suitable plasticizers include diethylene glycol dibenzoate, dipropylene glycol dibenzoate, tripropylene glycol dibenzoate, butyl benzyl phthalate, or a combination thereof. Exemplary plasticizers include phthalate based plasticizers. The plasticizer can be present in an amount of from 1% to 15%, based on the dry weight of the copolymer. For example, the plasticizer can be present in an amount of from 5% to 15% or from 7% to 15%, based on the dry weight of the copolymer. In some embodiments, the plasticizer can be present in an effective amount to provide coating formulations having a Tg less than ambient temperature (e.g., 20° C.). In some embodiments, the compositions do not include a plasticizer.

The compositions can further include a quick setting additive. The quick setting additive can decrease the setting time of the compositions. Exemplary quick setting additives suitable for use in the compositions described herein includes polyamines (i.e., polymers formed from either an amine-group containing monomer or an imine monomer as polymerized units such as aminoalkyl vinyl ether or sulfides; acrylamide or acrylic esters, such as dimethylaminoethyl (meth)acrylate; N-(meth)acryloxyalkyl-oxazolidines such as poly(oxazolidinylethyl methacrylate), N-(meth)acryloxyalkyltetrahydro-1,3-oxazines, and monomers that readily generate amines by hydrolysis). Suitable polyamines can include, for example, poly(oxazolidinylethyl methacrylate), poly(vinylamine), or polyalkyleneimine (e.g., polyethyleneimine). In some embodiments, the quick setting additive can include a derivatized polyamine such as an alkoxylated polyalkyleneimine (e.g., ethoxylated polyethyleneimine). Suitable derivatized polyamines are disclosed in U.S. Patent Application No. 2015/0259559 which is hereby incorporated herein by reference in its entirety.

The derivatized polyamines can include polyamines in which some number of the primary and/or secondary amine groups have been covalently modified to replace one or more hydrogen atoms with a non-hydrogen moiety (R). In some embodiments, the derivatized polyamines include alkoxylated polyamine groups. In certain embodiments, the composition contains an ethoxylated polyethyleneimine, a propoxylated polyethyleneimine, a butoxylated polyethyleneimine, or a combination thereof. In some embodiments, the derivatized polyamines include an alkylated polyalkyleneimine (e.g., an alkylated polyethyleneimine or an alkylated polyvinylamine), a hydroxyalkylated polyalkyleneimine (e.g., a hydroxalkylated polyethyleneimine or a hydroxyalkylated polyvinylamine), an acylated polyalkyleneimine (e.g., an acylated polyethyleneimine or an acylated polyvinylamine), or a combination thereof.

Derivatized polyamines are generally incorporated into the compositions in amounts less than 10% by weight, based on the dry weight of the copolymer. The amount of derivatized polyamine present in the composition can be selected in view of the identity of the derivatized polyamine, the nature of the copolymer present in the composition, and the desired setting time of the composition. In some embodiments, the polyamine such as the derivatized polyamine can be present in the composition at between 0.1% by weight and 5% by weight, based on the dry weight of the copolymer. In certain embodiments, the polyamine can be present in the composition at between 0.5% by weight and 2.5% by weight, based on the dry weight of the copolymer.

Pigments that can be included in the compositions can be selected from $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially available titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite clays and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes $TiO_2$, $CaCO_3$, and/or a clay.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide endcapped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener. Other suitable thickeners that can be used in the coating compositions can include acrylic copolymer dispersions sold under the STEROCOLL and LATEKOLL trademarks from BASF Corporation, Florham Park, N.J., hydroxyethyl cellulose, guar gum, jaguar, carrageenan, xanthan, acetan, konjac, mannan, xyloglucan, urethanes and mixtures thereof. The thickeners can be added to the composition formulation as an aqueous dispersion or emulsion, or as a solid powder.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)benzothiazole, 3-iodo-2-propynyl butyl carbamate, 2,4,5,6-tetrachloroi sophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof. Exemplary dispersants can include sodium polyacrylates in aqueous solution such as those sold under the DARVAN trademark by R. T. Vanderbilt Co., Norwalk, Conn.

Methods

The copolymers and compositions disclosed herein can be prepared by any polymerization method known in the art. In some embodiments, the copolymers disclosed herein are prepared by a dispersion, a mini-emulsion, or an emulsion polymerization. The copolymers disclosed herein can be prepared, for instance, by polymerizing the vinyl aromatic monomer, the (meth)acrylate monomer, the acid monomer, the optionally organosilane monomer, and the copolymerizable surfactant using free-radical aqueous emulsion polymerization. In some embodiments, the polymerization medium is an aqueous medium. Thus, the emulsion polymerization medium can include an aqueous emulsion comprising water, a vinyl aromatic monomer, a (meth)acrylate monomer, an acid monomer, optionally an organosilane monomer, and a copolymerizable surfactant. Solvents other than water can be used in the emulsion.

The emulsion polymerization can be carried out either as a batch, semi-batch, or continuous process. In some embodiments, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

A copolymer dispersion can be prepared by first charging a reactor with water, a vinyl aromatic monomer, a (meth)acrylate monomer, an acid monomer, optionally an organosilane monomer, and a copolymerizable surfactant. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature. The reaction temperature can be, for example, between 50° C. and 100° C. (e.g., between 55° C. and 95° C., between 58° C. and 90° C., between 61° C. and 85° C., between 65° C. and 80° C., or between 68° C. and 75° C.).

After the initial charge, the monomers that are to be used in the polymerization can be continuously fed to the reactor in one or more monomer feed streams. The monomers can be supplied as a pre-emulsion in an aqueous medium, particularly if acrylate monomers are used in the polymerization. An initiator feed stream can also be continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., 1.5-5 hours) to cause polymerization of the monomers and to thereby produce the polymer dispersion. A nonionic surfactant and any other surfactants can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers (e.g., a vinyl aromatic monomer, a (meth)acrylate monomer, an acid monomer, optionally an organosilane monomer, and a copolymerizable surfactant). The monomers can be fed in one or more feed streams with each stream including one or more of the monomers being used in the polymerization process. For example, the vinyl aromatic monomer, the (meth)acrylate monomer, the acid monomer, the optionally organosilane monomer, and the copolymerizable surfactant can be provided in separate monomer feed streams or can be added as a pre-emulsion. It can also be advantageous to delay the feed of certain monomers to provide certain polymer properties or to provide a layered or multiphase structure (e.g., a core/shell structure). In some embodiments, the copolymers are polymerized in multiple stages to produce particles having multiple phases. In some embodiments, the copolymers are polymerized in a single stage to produce a single phase particle.

The molecular weight of the copolymers can be adjusted by adding a small amount of molecular weight regulator as discussed herein, for example, 0.01 to 4% by weight, based on the monomers being polymerized.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators.

In addition to the monomers and initiator, an additional surfactant (i.e., emulsifier) such as those described herein can be fed to the reactor. The additional surfactant can be provided in the initial charge of the reactor, provided in the monomer feed stream, provided in an aqueous feed stream, provided in a pre-emulsion, provided in the initiator stream, or a combination thereof. The additional surfactant can also be provided as a separate continuous stream to the reactor. The additional surfactant can be provided in an amount of 1%-5% by weight, based on the total weight of monomer and surfactant. In some embodiments, the additional surfactant is provided in an amount less than 2% by weight.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide (e.g., t-butylhydroperoxide) and a reducing agent (e.g., sodium acetone bisulfate), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Deformers, coalescing aids, or a plasticizer can be added after the stripping step or at a later time if desired. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

The copolymers disclosed herein can also be used in any application wherein copolymers having a theoretical glass transition temperature ($T_g$) from −40° C. to 80° C. and a number average particle size of less than 250 microns can be used. As disclosed herein, the copolymers can be used in coating compositions. The coating compositions can be used for several applications, including membranes, films, adhesives, paints, coatings, carpet backing, foams, textiles, sound absorbing compounds, tape joint compounds, asphalt-aggregate mixtures, waterproofing membranes, and asphalt roofing compounds. In some embodiments, the coating can be provided as a paint, such as a semi-gloss paint. In some embodiments, the coating can be provided as an adhesive. In some embodiments, the adhesive can be a pressure sensitive adhesive. An adhesive can include the copolymer with one or more additives such as a surfactant. In some embodiments, the coating can be provided as a film. A film can include the copolymer with one or more coalescing aids and/or one or more plasticizers. In some embodiments, the coating can be provided as a membrane. A membrane can include the copolymer with one or more of a binder, a filler, a cementitious material, a thickener, or a combination thereof. Generally, coatings are formed by applying the coating composition as described herein to a surface, and allowing the coating to dry to form a dried coating. The surface can be, for example, a PVC pipe, concrete, brick, mortar, asphalt, a granulated asphaltic cap sheet, carpet, a granule, pavement, a ceiling tile, a sport surface, an exterior insulation and finish system (EIFS), a spray polyurethane foam surface, a thermoplastic polyolefin surface, an ethylene-propylene diene monomer (EPDM) surface, a modified bitumen surface, a roof, a wall, a storage tank, an expanded polystyrene (EPS) board, a wood, a plywood, an oriented strand board (OSB), a metal sheathing, an interior sheathing or exterior sheathing (including gypsum board or cement board), a siding, or another coating surface (in the case of recoating applications).

The coating composition can be applied to a surface by any suitable coating technique, including spraying, rolling, brushing, or spreading. The composition can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

In some embodiments, the compositions disclosed herein can be used in adhesives having improved film clarity and blush resistance. The term "blush" or "blushing" refers to a cured coating (including polymer films) or laminate whose normally visible exterior surface exhibits, after extended immersion in water, a change in coloration (e.g., as a decrease in saturation, change in hue, decrease in lightness, or increase in film opacity or cloudiness) discernible by a typical observer under normal indoor illumination. In some embodiments, coating compositions comprising copolymers containing a copolymerizable surfactant and optionally, one or more coalescing aids as described herein can exhibit blush resistance (or will not blush) after 16 hours of exposure to 25° C. water. For example, coating compositions comprising copolymers and one or more coalescing aids described herein can have a blush resistance of at least 17 hours, at least 18 hours, at least 19 hours, at least 20 hours, at least 22 hours, or at least 24 hours when exposed to 25° C. water. The compositions can exhibit improved film clarity and blush resistance whether in the presence or absence of coalescing aids. The blushing resistance can be determined as described herein. For example, a 40 mil neat polymer film of the copolymer dispersion can be prepared. A sufficient amount of de-ionized water (about 4 drops or more) is then placed on the dried polymer film. The water is covered with a suitable cover to prevent evaporation. Any change in the color or opacity of the polymer film is recorded at appropriate intervals (such at 0 min, 15 mins, 30 mins, 1 hr, 2 hrs, 4 hrs, and 24 hrs). The film is then compared to a film discoloration reference chart.

In some embodiments, the compositions disclosed herein can be used in decorative or water resistant coatings. For example, the copolymers containing a copolymerizable surfactant as disclosed herein when formulated into water resistant coatings that are applied on porous walls provide for protection against leakage for hydrostatic pressures of 4 psi or higher (e.g., 5 psi or higher, 10 psi or higher, 12 psi or higher, 15 psi or higher, 17 psi or higher, or 20 psi or higher). In some embodiments, the copolymers disclosed herein when formulated into water resistant coatings on porous walls provide protection against leakage for hydrostatic pressures of up to 20 psi such as from 4 psi to 20 psi or from 10 psi to 20 psi. The hydrostatic resistance can be determined in accordance with ASTM D7088-08.

By way of non-limiting illustration, examples of certain embodiments of the present disclosure are given below.

EXAMPLES

Example 1: Determination of Blush Resistance of Copolymer Dispersions

Copolymer dispersions derived from butyl acrylate, styrene, acrylic acid, acrylamide, itaconic acid, 0.5 parts copolymerizable surfactant, and optionally about 0.6 parts silane as described in Table 1, were produced. The dispersions comprise from about 43% to about 46% solids. Following the polymerization process, a plasticizer and a coalescing agent were added to the copolymer dispersion. In exemplary copolymer dispersions, propylene glycol n-butyl ether (5-21% by weight, based on the dry weight of the copolymer) and/or dipropylene glycol n-butyl ether (2-9% by weight, based on the dry weight of the copolymer) can be added to the copolymer dispersion.

The blush resistance of films formed from the copolymer dispersions can be determined. by the following method:

1. Prepare a 40 mil film according to the procedure for making neat polymer films described below.
2. Place a sufficient amount of de-ionized water (about 4 drops or more) on the dried polymer film.
3. Cover the water with a suitable cover to prevent evaporation.
4. Observe and record any change in the color or opacity of the polymer film at appropriate intervals (such at 0 min, 15 mins, 30 mins, 1 hr, 2 hrs, 4 hrs, and 24 hrs).
5. Compare the film to a film discoloration reference chart.

Preparation of Neat Copolymer (Latex) Films:

a neat polymer film of the copolymer dispersion can be prepared using the method described below. However, before the method is described, the following may be applicable:

1. Within any one series of tests, the dry film thickness should be within ±10% for suitable comparison.
2. A dry film thickness of approximately 0.040 inch is typically used for determining tensile strength and elongation. A dry film thickness of 0.040 inch can be prepared as follows:

2a. Calculate the amount of dispersion and water required to make approximately 100 grams of approximately a 40% solids blended solution.

2b. The following calculation can be used to calculate the amount of undiluted latex needed.

(Target solids/latex solids)×desired total amount=undiluted latex amount to use

The method for preparing the neat polymer film is as follows:

1. Weigh a suitable amount of undiluted latex in a mixing container and add deionized or distilled water to the container to the desired total amount.
2. Stir the diluted dispersion slowly and blend the solution thoroughly while trying to incorporate no extra air during mixing.
3. Level the mold for forming the film in all directions using a thin leveling cardboard shims and level.
4. Slowly pour an appropriate amount of the diluted dispersion through a mesh screen into the release mold. The screen is used to remove large particles and air bubbles from the solution.
5. Gently tip the mold from side to side to ensure equal coverage of the mold interior.
6. Allow the film to air dry for a minimum of 3 days at standard laboratory conditions (72±2° F. and 50±5% R.H.). Avoid noticeable air currents when leaving the film to dry. This can cause cracking.

6a. Optionally, a coalescent or elevated temperature is used for drying high Tg copolymers to help prevent film cracking. If used, the dilution rate, the coalescent type, usage level, and the time and temperature should be recorded with any report of the films performance.

7. Optionally, after the 3-day period above, the film is removed from the mold and turned over to allow drying of the opposite side of the film or allowed to hang freely. To remove tacky films from a mold, chill the film and mold in a freezer and release the film while cold. Tacky films may be chilled in a freezer for a period of approximately 1 hr. or more to ease removal from the mold. To ease handling of a tacky film, the film may be coated with talcum powder to ease sticking or placed on top of a good release paper. If film appearance rating is required, this should be done before talcum powder is applied. Do not use talcum if films will be tested for water blushing.

8. Allow the film to cure for at least 4 more days at standard laboratory conditions before testing. In general, films made from a single dispersion are usually clear whereas those made from blends of different dispersions may show a cloudy appearance. Cloudiness in a film may also be an indication of residual moisture. In the latter case, the drying time should be increased or the film thickness decreased or both.

9. To measure the gauge of a tacky film, measure the thickness of two sheets of release paper, then place the film between the two sheets of release paper and measure the thickness of the sandwich. Subtract the thickness of the two sheets to obtain the film thickness.

TABLE 1

Copolymer compositions.

| Sample ID | BA (wt %) | S (wt %) | AA (wt %) | IA (wt %) | Acrylamide (wt %) | Silane (wt %) | Seed (wt %) | Particle size* (μm) | Temp, ° C. |
|---|---|---|---|---|---|---|---|---|---|
| A | 42.45 | 53.48 | 1.77 | 0.5 | 1.2 | 0.6 | 1.05 | 0.109/0.094 | 85 |
| B | 42.45 | 53.48 | 1.77 | 0.5 | 1.2 | 0.6 | 0.89 | 0.153/0.136 | 85 |
| C | 42.45 | 53.48 | 1.77 | 0.5 | 1.2 | 0.6 | 1.0 | 0.125/0.108 | 80 |
| D | 42.75 | 53.78 | 1.77 | 0.5 | 1.2 | 0 | 1.05 | 0.109/0.09 | 85 |
| E | 42.75 | 53.78 | 1.77 | 0.5 | 1.2 | 0 | 1.05 | 0.090/0.065 | 85 |
| G | 42.75 | 53.78 | 1.77 | 0.5 | 1.2 | 0 | 1.05 | 0.093/0.084 | 85 |

*Two descriptions for the copolymer particle size are provided. The first is the volume-average particle size and the second is the number-average particle size. The ratio of the volume-average particle size and the number-average particle size provides an indication of the copolymers particle size distribution. A ratio of 1 indicates a monomodal system and deviations from 1 suggest a wider particle size distribution, including bimodal distributions.

Results and Discussion:

After 16 hours of being exposed to the water droplets, no discoloration of the films was observed. The films formed from the copolymers dispersions has a blush resistance of at least 16 hours when exposed to tap water.

Example 2: Determination of the Hydrostatic Resistance of Copolymer Dispersions

Copolymer formulations derived from about 42% butyl acrylate, about 53% styrene, about 2% acrylic acid, about 1.5% acrylamide, about 0.5% itaconic acid, about 0.5 parts copolymerizable surfactant, and optionally about 0.6 parts silane was produced as described in Table 2. The resistance to hydrostatic pressure provided by coatings comprising the copolymer were determined according to ASTM D7088-08.

TABLE 2

Copolymer formulations

| Sample ID | Silane in copolymer | Formulation viscosity (KU) | Hydrostatic resistance per D7088-08 | Comments |
|---|---|---|---|---|
| 1 | Yes | 134 | Fair | Films exhibited some blistering. No weeping was observed. |
| 2 | No | 134 | Excellent | No weeping or blistering was observed on the surface. |
| 3 | Yes | 124 | Fair | No blistering or softening of the film was observed. Some weeping on side of the block. |
| 4 | Yes | 133 | Excellent | No blistering or softening of the film was observed. Pinhole failure noted but appears to be due to the method of application. |
| 5 | Yes | 137 | Excellent | No blistering or softening of the film observed. No seal leaks observed. |
| 6 | Yes | 133 | Excellent | No blistering or softening observed even when hydrostatic pressure was ramped up to 12 psi for 5 minutes, then up to 13.5 psi for 5 minutes, then up to 15.0 psi for 5 minutes, then up to 17.5 psi for 1 minute and finally 20.0 psi for 4 minutes. |
| 7 | No | 135 | Very Good | No blistering or softening observed in second run. |
| 8 | Yes | 115 | Fair | Substantial weeping on all sides of the block when pressure applied. As the pressure increased, the weeping increased. |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A composition, comprising:
a copolymer derived from monomers comprising
50 to 55% by weight of styrene;
40 to 45% by weight of butyl acrylate,
1% to 3% by weight of an acid monomer which is a mixture of itaconic acid and acrylic acid;
0.75 to 2% by weight of an additional monomer which is (meth)acrylamide, or
a mixture of (meth)acrylamide and an organosilane; and
0.1 to 0.75% by weight of a copolymerizable surfactant which is according to Formula IIIa:

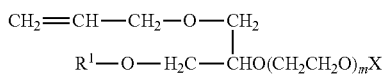

wherein $R^1$ is $C_9$-$C_{15}$ alkyl or $C_7$-$C_{11}$ alkyl-phenyl, X is H, $SO_3NH_4$ and/or $SO_3N_4$, and m is 3 to 50; and
wherein the copolymer has a theoretical glass transition temperature ($T_g$) from $-10°$ C. to $50°$ C. and
wherein the copolymer has a number average particle size of 200 nm or less.

2. The composition according to claim 1, wherein the copolymer further includes lauryl (meth)acrylate.

3. The composition according to claim 1, wherein the organosilane monomer is present and is represented by the formula $(R^1)$—(Si)—$(OR^2)_3$, wherein $R^1$ is a $C_1$-$C_8$ substituted or unsubstituted alkyl or a $C_1$-$C_8$ substituted or unsubstituted alkene and $R^2$, which are the same or different, each is a $C_1$-$C_8$ substituted or unsubstituted alkyl group.

4. The composition according to claim 1, wherein the organosilane monomer is present and includes vinyltrimethoxysilane, vinyltriethoxysilane, vinyl tris(2-methoxyethoxysilane), vinyl triisopropoxysilane, (meth)acryloyloxypropyltrimethoxysilane, γ-(meth)acryloxypropyltrimethoxysilane, γ-(meth)acryloxypropyltriethoxysilane, or a mixture thereof.

5. The composition according to claim 1, wherein the copolymer has a theoretical glass-transition temperature of from $-10°$ C. to $40°$ C.

6. The composition according to claim 1, wherein the copolymer has a number average particle size of 100 nm or less.

7. The composition according to claim 1, wherein $R^1$ is $C_{10}$-$C_{14}$ alkyl, X is H and/or $SO_3NH_4$, and m is 5 to 40.

8. A composition consisting essentially of:
a copolymer derived from monomers consisting essentially of:
50 to 55% by weight of styrene;
40 to 45% by weight of butyl acrylate;
1% to 3% by weight of an acid monomer which is a mixture of itaconic acid and acrylic acid;
0.75% to 2% by weight of an additional monomer wherein the additional monomer is selected from;
(meth)acrylamide, or
a mixture of (meth)acrylamide and an organosilane;and
0.1 to 0.75% by weight of a copolymerizable surfactant which is according to Formula IIIa:

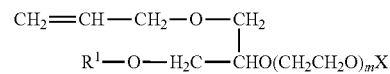

wherein $R^1$ is $C_9$-$C_{15}$ alkyl or $C_7$-$C_{11}$ alkyl-phenyl, X is H, $SO_3NH_4$ and/or $SO_3Na$, and m is 3 to 50; and
0.5% by weight to 2.5% by weight of a polyamine based on the dry weight of the copolymer;
wherein the copolymer has a theoretical glass transition temperature ($T_g$) from $-10°$ C. to $50°$ C., and
wherein the copolymer has a number average particle size of 200 nm or less.

9. The composition according to claim 1, which further comprises 0.5% by weight to 2.5% by weight of a polyamine based on the dry weight of the copolymer.

10. The composition according to claim 1, wherein the copolymerizable surfactant is present in an amount from 0.3 to 0. 5% by weight.

11. A coating comprising the composition according to claim 1 and one or more coalescing aids.

12. The coating according to claim 11, wherein the coating when applied on porous walls provides a resistance to hydrostatic pressure of at least 4 psi in accordance with ASTM D7088-08.

13. The coating according to claim 11, wherein the coating has a blush resistance of at least 16 hours when exposed to water.

14. The coating according to claim 11, wherein the coating is a paint, membrane, or adhesive.

* * * * *